S. KEPNER.
Detaching Horses.
No. 30,972. Patented Dec. 18, 1860.
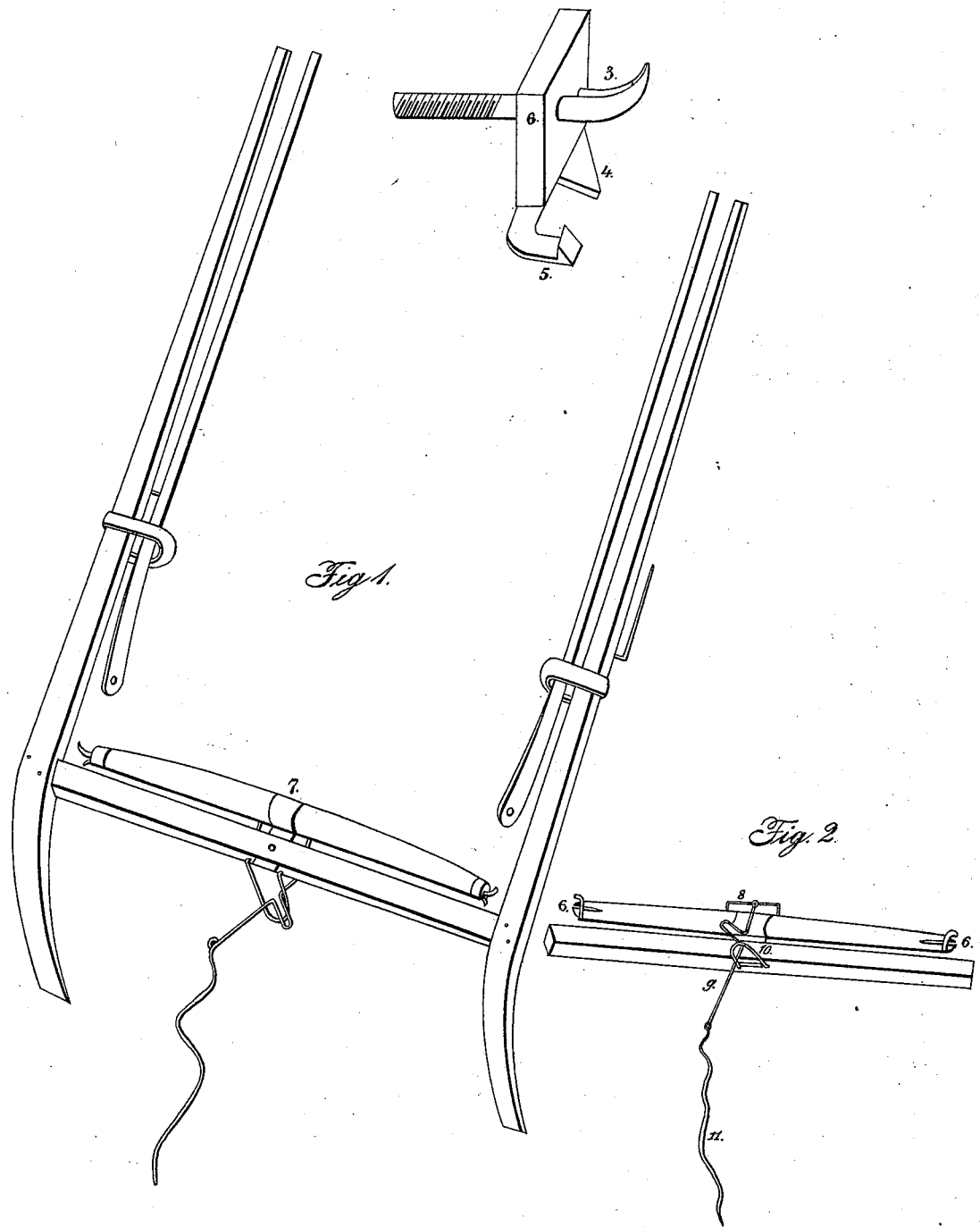

UNITED STATES PATENT OFFICE.

SOLOMON KEPNER, OF NORTH COVENTRY, PENNSYLVANIA.

DETACHING HORSES FROM CARRIAGES.

Specification of Letters Patent No. 30,972, dated December 18, 1860.

*To all whom it may concern:*

Be it known that I, SOLOMON KEPNER, of North Coventry, Chester county, in the State of Pennsylvania, have invented a new and useful swingletree by which a horse can be detached from the shafts instantly and which is in all respects safe and reliable; and I do hereby declare that the following is a full, clear, and exact description of the construction and operation of the same, reference being had to the annexed drawings, making a part of this specification, in which—

Figure 1 and Fig. 2 are perspective views of said swingletree; Fig. 3 is a hook on which the trace is fastened; Fig. 4 a guide under the hook Fig. 3; Fig. 5 a hook which holds the trace firmly in its place. Fig. 6 is a metallic plate to which the guide and hooks are affixed and which when screwed on the end of the swingletree makes it complete; Fig. 7 an iron strap by which the swingletree is fastened to the shafts and in which it partially revolves. Fig. 8 is a staple in the swingletree; Fig. 9 a small bar one end of which is fastened to Fig. 8; the other end passes through. Fig. 10 a slot or staple on the cross-piece of the shafts; Fig. 11 a strap fastened to the end of the bar, Fig. 9, passing under the spring of the carriage up through the floor.

The operation is as follows: When the strap, Fig. 11, is slightly drawn from inside of the carriage, the bar, Fig. 9, is raised in the staple, Fig. 10. The swingletree is then free and makes the fourth of a revolution, which movement is effected by means of drawing the strap, Fig. 11, and while revolving, Fig. 5, loosens its hold on the trace and the guide, Fig. 4, forces the trace off the hook, Fig. 3. The animal is then free to pass out of the shafts.

What I claim as my invention and desire to secure by Letters Patent is—

The combination of the bar Fig. 9, and the revolving swingletree with its two hooks and guide, arranged as described for the purpose set forth.

SOLOMON KEPNER.

Witnesses:
MARIA HEPNER,
M. J. SHADLE.